2,786,742
Patented Mar. 26, 1957

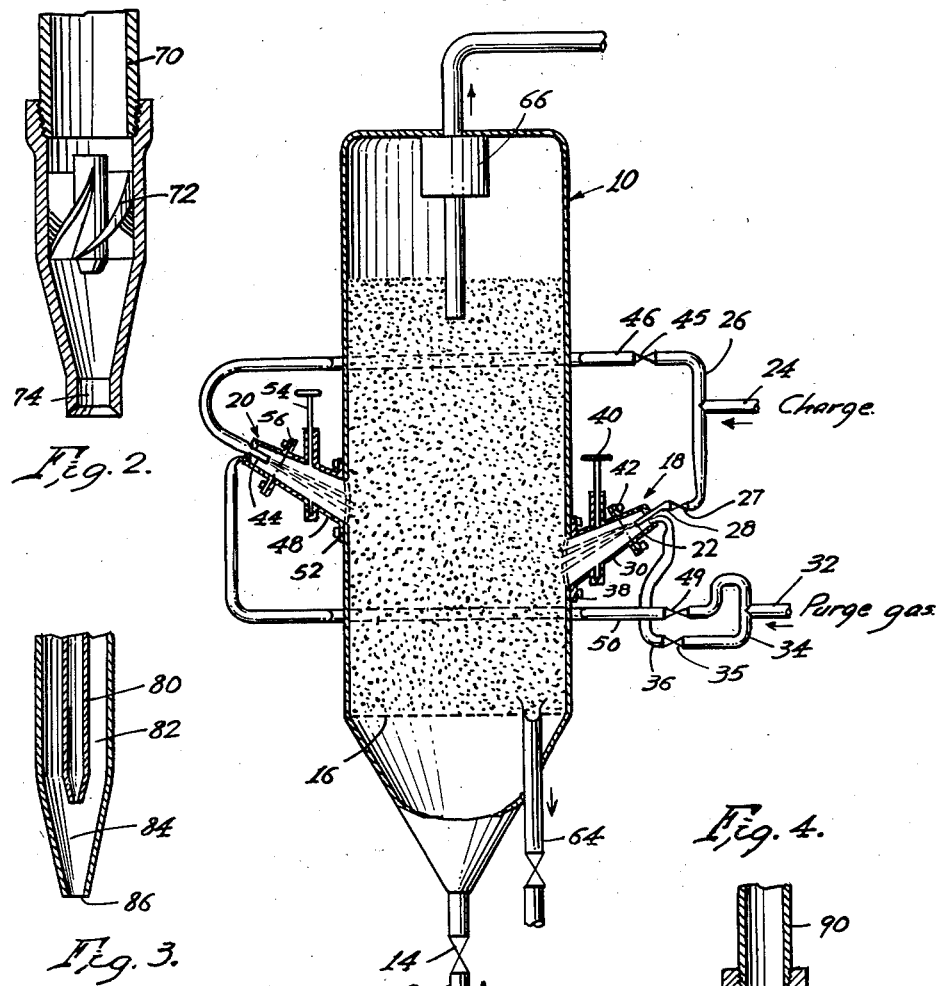

2,786,742

REACTOR ADAPTED FOR CONTAINING FLUIDIZED PARTICLES

Joseph B. McKinley, Pittsburgh, and Michael J. Derrig, Verona, Pa., assignors to Gulf Research & Development Company, Pittsburgh, Pa., a corporation of Delaware Application April 4, 1952, Serial No. 280,472

5 Claims. (Cl. 23—288)

This invention relates to a reactor adapted for containing fluidized particles.

It has been proposed to spray fluid charges containing components which are at least partially in liquid phase and may be entirely in liquid phase, directly into a dense phase bed of fluidized particles by the use of reactors containing nozzles located within the reactor. This proposed procedure is not fully satisfactory. Frequently, after liquid components are sprayed from the nozzle into the fluid bed, the wetted fluidized particles collect upon the nozzles. The collection of these particles upon the nozzles leads to the formation of large clumps and not only interfere with the introduction of liquid into the fluid bed but also acts as a locus for improper reaction. Furthermore, when the clumps fall from the nozzle, they disrupt the fluid bed and may cause bed classification.

Moreover, cleaning and/or replacing the nozzles of such reactors presents difficulties, as it requires having a man enter into the reactor. This requires taking the reactor off-stream, and more or less dismantling it. Such action is not only laborious, but is also expensive.

Still another problem encountered with these reactors is that of shutting them down when they are full of catalyst. Unless special purging means are available, the settled catalyst will accumulate about the nozzle and may result in plugging it.

Our invention provides a reactor adapted for containing a dense phase bed of fluidized particles and containing at least one spray unit comprising a nozzle in which the foregoing difficulties are avoided when at least a portion of the fluid charge to the reactor comprises components which are at least partially in liquid phase. This is accomplished by providing the reactor with an outlet such as a conventional cyclone separator outlet and an inlet comprising at least one spray unit located on the shell of the reactor. The spray unit comprises a shroud and a nozzle located within the shroud for spraying the fluid charge into the reactor through an orifice. Purge gas for the shroud is conveyed to it by means of a conduit. For the advantageous operation of our apparatus the purge gas for the shroud should have a sufficient linear velocity to prevent the fluidized particles within the reactor from entering the shroud. Moreover, when operating the spray unit, the spray pattern from the nozzle should be such that the spray is prevented from contacting the shroud.

In a preferred modification, the reactor of our invention contains a plurality of spray units located on the reactor shell wall. It is advantageous in this modification to have the purge gas for the shroud of each spray unit provided by a manifold, and to provide the charge for the nozzle means of each spray unit by a second manifold. It is most advantageous to have the spray units readily detachable from the reactor shell wall. This can advantageously be accomplished by having the spray unit either flanged to the shell wall or threaded into the shell wall. By having the spray unit readily detachable, facile cleaning and removal of the spray unit can be effected.

In many cases, such as where the reactor is operated intermittently, and its catalyst inventory allowed to settle, it is advantageous to provide a gate valve in the shroud before the nozzle orifice. This permits the nozzle to be protected when the reactor is off-stream as the gate valve can then be shut and the catalyst particles within the reactor prevented from contacting the nozzle. In a preferred modification means for detaching the nozzle from the spray unit is provided. Thus the nozzle means can be threaded into the shroud and readily detached therefrom, or a flanged coupling can be provided on the shroud in back of the gate valve for detaching the nozzle and the shroud immediately around the nozzle from the remainder of the spray unit. This permits the removal of the nozzle from the remainder of the spray unit when the gate valve is shut. Thus after the gate valve is shut, the nozzle can be removed even though the reactor is on-stream.

While all of the charge and fluidizing gas can be added to the reactor by means of the afore-mentioned spray units, it is usually advisable to provide inlet means for introducing fluid, such as fluidizing gas to the bottom portion of the reactor. Thus a portion of the fluidizing gas and/or a vaporized fraction of the charge may be added to a riser pipe at the bottom of the reactor surmounted by a foraminous grid. Moreover, the fluid charge may be introduced into the reactor by other inlet means in conjunction with the spray units located on the shell of the reactor. For example, a portion of the charge can be introduced by means of nozzles, such as shrouded nozzles, located within the portion of the reactor containing the dense phase fluid bed, or by means of spray nozzles located in the dispersed phase or dilute phase of fluidized particles in the upper portion of the reactor.

Any type of conventional nozzle means which will product a satisfactory spray of the liquid components of a fluid charge comprising liquid components is adequate for the purposes of our invention. As heretofore indicated, such nozzle means must be located within a shroud so that the base of the shroud is beyond the nozzle orifice. Inasmuch as the spray exiting from the nozzle means is ordinarily conical in shape, it is advantageous, although not absolutely necessary, to use a conical shroud conforming to the shape of the spray. However, other geometrical forms of shrouds can be employed such as cylindrical shrouds, polygonal shrouds, hemispherical shrouds, etc. Regardless of the shape of the shroud, the nozzle should be so located within the shroud that during operating conditions the area of the spray from the nozzle at the shroud base is less than, and preferably is not more than about three-fourths of, the area of the shroud base. This will ordinarily insure against the wetting of the internal shroud walls. Moreover, the design of the shroud and its relationship to the nozzle as well as the relative positions of the conduit orifice introducing purge gas to the shroud should be such that turbulence of the purge gas within the shroud is at a minimum. To effect this, it is usually advantageous to have the orifice of the nozzle along the longitudinal axis of the shroud, and to introduce the purge gas into the inner portion of the shroud in back of the nozzle orifice in such manner as to cause it to flow in the same direction as the spray issuing from the nozzle orifice. However, other arrangements for reducing turbulent flow within the shroud can be used. By reducing such turbulent flow within the shroud, the possibility of introduction of particles into the shroud from the fluidized bed within the reactor is materially lowered.

Preferably, the nozzle means is directed downwardly at an oblique angle. However, it can be directed at other angles, such as vertically downwardly, horizontally, and upwardly, either vertically or at an oblique angle. When the nozzle means is pointed upwardly, a higher rate of flow of purge gas through the shroud will be necessary to prevent catalyst from entering the shroud. The spray unit can be located at any height on the reactor shell. When a mixed phase charge is added to the reactor, the vapor phase components can be given a short catalyst contact time, if desired, by locating the spray unit high on the reactor.

Nozzle means discharging sprays as droplets and also nozzle means discharging sprays comprising thin solid streams of liquid which break up upon contact with the fluidized particles in the fluid bed within the reactor can be employed in the apparatus of our invention. The maximum diameter of the droplets derived from the spray should preferably be about the same diameter as that of the fluidized particles, although nozzles yielding somewhat larger droplets are satisfactory. When the size of the spray droplet is not larger than that of the fluidized particles or is smaller, the chance for any given liquid droplet wetting a number of fluidized particles is decreased. This is desirable as it materially reduces the possibility of particle agglomeration.

The accompanying drawings, which are hereby incorporated into our application, are as follows:

Figure 1 is a diagrammatic sectional view through one embodiment of our apparatus.

Figure 2 is a diagrammatic view of a form of nozzle means which is suitable for use in the apparatus of our invention.

Figure 3 is a diagrammatic view of another form of nozzle means which is suitable for use in the apparatus of our invention.

Figure 4 is a diagrammatic view of an additional form of nozzle means which is suitable for use in the apparatus of our invention.

For a description of one embodiment of the apparatus of our invention reference should be had to accompanying Figure 1. Reactor 10 which is adapted for containing a dense phase bed of fluidized particles comprises a cylindrical shell having a conically tapered base. Fluid inlet pipe 12 containing valve 14 enters the conically tapered base of reactor 10. Grid 16 serves to distribute the fluidizing medium entering the bottom of reactor 10 through the dense phase bed of fluidized particles located in reactor 10.

Spray units 18 and 20 comprise additional inlets for reactor 10. Spray unit 18 comprises nozzle means 22 adapted for spraying a fluid charge comprising components which are at least partially in liquid phase, which fluid charge is obtained from line 24, manifold 26, valve 27, and line 28. Nozzle means 22 is located within shroud 30 which is supplied by purge gas from line 32, manifold 34, valve 35, and line 36. Shroud 30 is attached at its basal edge to the shell of reactor 10 by means of flanges 38 and surrounds an opening in said shell. Shroud 30 is readily detachable from the shell wall. Gate valve 40 is located on the wall of shroud 30 before the orifice of nozzle means 22. Shroud 30 is in two sections which are connected by a flanged coupling 42 located after gate valve 40. This coupling permits the detachment of nozzle means 22 and a portion of shroud 30 immediately surrounding said nozzle means from the remainder of shroud 30.

Spray unit 20 is identical to spray unit 18 and comprises nozzle means 44 adapted for spraying a fluid charge comprising components which are at least partially in liquid phase, which fluid charge is obtained from line 24, manifold 26, valve 45, and line 46. Nozzle means 44 is located within shroud 48 which is supplied by purge gas from line 32, manifold 34, valve 49, and line 50. Shroud 48 is attached at its basal edge to the shell of reactor 10 by means of flanges 52 and surrounds an opening in said shell. Shroud 48 is readily detachable from the shell wall. Gate valve 54 is located on the wall of shroud 48 before the orifice of nozzle means 44. Shroud 48 is in two sections which are connected by flanged coupling 56 which is located after gate valve 54. Flanged coupling 56 permits the detachment of nozzle means 44 and a portion of shroud 48 immediately surrounding said nozzle means from the remainder of shroud 48.

Reactor 10 is provided with outlet means comprising a particle outlet 64 consisting of a standpipe and a valve located in the bottom portion of reactor 10 for removing fluidized particles therefrom, and a gas outlet 66 comprising a cyclone separator and a pipe leading therefrom. The cyclone separator serves to return fluidized particles to the fluid bed.

We shall disclose the operation of the apparatus shown in Figure 1 as applied to the preparation of impregnated catalyst. It is, of course, to be understood that the apparatus shown in Figure 1 may be employed for other uses, such as a reactor for fluid catalytic hydrogenation, fluid catalytic cracking, etc. For the purposes of the instant example, reactor 10 is approximately 3 feet in diameter by 10 feet in height. Reactor 10 is filled for two-thirds of its height with an expanded fluidized catalyst base comprising synthetic silica-alumina microspheres. The volume of the expanded catalyst base is about 47 cubic feet. The expanded base is maintained at a fluid bed temperature of about 85° C. by heated fluidizing gas consisting of air. This heated fluidizing gas is introduced through line 12, valve 14 and grid 16 into the bottom of reactor 10 at such a rate as to give a linear velocity of about 0.3 feet per second in the fluid bed. An aqueous impregnating solution comprising a mixture of nickel nitrate and ammonium metatungstate which has been preheated to the fluid bed temperature of 85° C. is introduced through line 24 and manifold 26 to valves 27 and 45, and lines 28 and 46 leading to respective nozzle means 22 and 44. Purge gas such as air is introduced to each of shrouds 30 and 48 from line 32, manifold 34, valves 35 and 49, and lines 36 and 50. The diameter of the base of each shroud is about 0.75 feet. The sprayed liquid is discharged from the orifice of nozzle means 22 and 44 at a maximum rate of about 0.2 gallon per second per square foot of shroud base area, and in such a pattern as to avoid contact with the shroud wall before contacting catalyst at the base of the shroud. Purge gas is passed through the shroud at a linear velocity of about 4 feet per second (measured at the base of the shroud). Under these conditions, the fluidized particles from the fluid bed are prevented from entering the shroud. The purge and fluidizing gases are removed from reactor 10 through gas outlet 66. The cyclone separator in gas outlet 66 returns entrained particles to the fluid bed in reactor 10.

The addition of liquid is continued until about 15 cubic feet of impregnating solution have been added. At this point, the addition of solution is stopped, and the temperature of the fluid bed raised to about 125° C. by gradually raising the temperature of the fluidizing gas introduced into the reactor 10 through line 12 and valve 14 and the impregnated catalyst particles are dried. Volatilized moisture is removed from reactor 10 with the fluidizing gas by means of gas outlet 66. If it is desirable to raise the level of impregnant on the catalyst base, the impregnation process can be repeated either before or after calcining.

If during the course of the impregnation, mechanical difficulties are encountered with either nozzle means 22 or 44, repairs can be effected without terminating the impregnation. Thus assume that nozzle means 22 has become inoperative. Upon ascertaining this, gate valve 40 is closed and the flow of charge to nozzle means 22 terminated by closing valve 27, and the flow of purge gas to shroud 30 terminated by closing valve 35. Flanged coupling 42 can then be unbolted and repairs effected on nozzle means 22. After such repairs have been completed, flanged coupling 42 can be bolted in place, and the flow of purge gas started through shroud 30 by opening valves 35 and 40 in sequence. Valve 27 can then be opened and the charging of impregnating solution resumed.

After the desired level of impregnant has been attained, the dried catalyst is removed from fluid reactor 10 through particle outlet 64 and the catalyst calcined at an elevated temperature, such as about 900° to 1300° F. in external equipment (not shown). The calcined material may be employed as hydrogenation catalyst.

In the foregoing example, the fluid charge comprising the impregnating solution, was introduced into reactor 10 substantially in liquid phase. Under these conditions a nozzle of the type shown in accompanying Figure 2 is especially suitable. The liquid charge is introduced to the nozzle from pipe 70 and is imparted a circular motion by striking vanes 72 which results in the liquid spiraling down the side of the nozzle to orifice 74 from which it is discharged as a hollow conical spray. If there is a hole through the center member supporting the vanes, part of the liquid jets through this opening and a solid conical spray is produced.

Where the fluid charge is in the liquid phase or in the mixed phase, with a major portion in the liquid phase, a spray nozzle such as that shown in accompanying Figure 3 is suitable. The mixed phase charge is passed through center member 80 of the nozzle. Purge gas similar to the gas used in the shroud is flowed through the annular space 82. The charge from center member 80 and the gas from annular space 82 are mixed in chamber 84 before discharging through orifice 86. In nozzles of this type it is advantageous to taper both the end of the center member 80 and the end of the tube enclosing annular space 82 at an angle of about 30°.

Where the fluid charge is in mixed phase and comprises a major portion of vapor, a nozzle of the type shown in accompanying Figure 4 is especially suitable. The mixed phase charge is passed through a tube 90 terminating in a venturi 92 prior to orifice 94. Intimate mixing of the gas and liquid phases is accomplished by maintaining turbulent flow in tube 90 leading up to venturi 92. The turbulence is increased in venturi 92 so that the spray discharged from orifice 94 comprises an intimate mixture of gas and liquid. It is desirable to have an included angle for the entrance to the venturi of about 30° and an included angle for the exit of the venturi of about 7°.

While the foregoing embodiments of our apparatus constitute preferred modifications, it is obvious that our apparatus may be modified by one skilled in the art. It is to be understood that these modifications constitute a part of our invention and are to be considered as included within the appended claims. By way of example, other forms of nozzles than those heretofore described, such as those readily apparent to those skilled in the art, can be employed. Moreover, the nozzle means within the shroud of the spray units of our invention can comprise more than one nozzle, or a nozzle having a plurality of orifices. In addition, other forms of outlets from the reactor than those specifically disclosed can be used.

The utilization of the apparatus of our invention permits the facile fluid treatment of charges which are at least partially in liquid phase, and which may be entirely in liquid phase at the conditions present in the apparatus. Improper reaction conditions and agglomeration of the fluidized particles are avoided by the utilization of our apparatus. Moreover, rapid and easy cleaning and repairs can be effected on the spray units of our apparatus.

Obviously many modifications and variations of the invention as hereinabove set forth can be made without departing from the spirit and scope thereof; therefore only such limitations should be imposed as are indicated in the appended claims.

We claim:

1. In a reactor adapted for containing a dense phase bed of fluidized solid particles, wherein said bed is contacted with a fluid charge containing components at least partially in the liquid phase, said reactor being a closed shell provided with means for introducing a fluidizing medium therein, means for withdrawing gases therefrom and means for withdrawing said solid particles therefrom, the improvement which comprises at least one inlet for introducing said fluid charge into said shell, said inlet being mounted on said shell and comprising a spray nozzle adapted to produce a spray of the liquid components of said fluid charge, a shroud surrounding said nozzle and communicating with the interior of said shell, and means for passing a purge gas through said shroud and into said shell.

2. In a reactor adapted for containing a dense phase bed of fluidized solid particles, wherein said bed is contacted with a fluid charge containing components at least partially in the liquid phase, said reactor being a closed shell provided with means for introducing a fluidizing medium therein, means for withdrawing gases therefrom and means for withdrawing said solid particles therefrom, the improvement which comprises at least one spray unit for introducing said fluid charge into said shell, said unit being mounted on said shell and comprising a shroud communicating at one end with the interior of said shell and being closed at the other end, a spray nozzle adapted to produce a spray of the liquid components of said fluid charge disposed within said shroud between the ends thereof, the orifice of said nozzle being directed towards the interior of said shell, and means disposed between said nozzle orifice and the closed end of said shroud for passing a purge gas through said shroud and into said shell.

3. In a reactor adapted for containing a dense phase bed of fluidized solid particles, wherein said bed is contacted with a fluid charge containing components at least partially in the liquid phase, said reactor being a closed shell provided with means for introducing a fluidizing medium therein, means for withdrawing gases therefrom and means for withdrawing solid particles therefrom, the improvement which comprises at least one spray unit for introducing said fluid charge into said shell, said unit being mounted on said shell and comprising a conical shroud attached at its base to said shell and communicating with the interior thereof, a spray nozzle adapted to produce a spray of the liquid components of said fluid charge disposed within said shroud between the apex and base thereof, the orifice of said nozzle being directed along the axis of said shroud towards the interior of said shell, a gate valve mounted in said shroud between said nozzle orifice and the base of said shroud, and means adjacent the apex of said shroud for directing a purge gas past said nozzle orifice through said shroud and into said shell.

4. The reactor of claim 3, wherein the base of said conical shroud is detachably connected to said shell, and the spray nozzle is detachably mounted in said shroud.

5. The reactor of claim 3, wherein there are a plurality of spray units, and there are provided a first manifold for passing fluid charge to each spray nozzle in said spray units, and a second manifold for passing purge gas to each shroud in said spray units.

References Cited in the file of this patent

UNITED STATES PATENTS

| | | |
|---|---|---|
| 1,746,180 | Ainscow | Feb. 4, 1930 |
| 2,418,003 | Angell | Mar. 25, 1947 |
| 2,506,317 | Rex | May 2, 1950 |
| 2,543,884 | Weikart | Mar. 6, 1951 |
| 2,577,632 | Roetheli | Dec. 4, 1951 |
| 2,628,158 | Wilcox et al. | Feb. 10, 1953 |

OTHER REFERENCES

Industrial and Engineering Chemistry, Apr. 1948, page 568.